(12) United States Patent
Dubé

(10) Patent No.: US 7,281,167 B2
(45) Date of Patent: Oct. 9, 2007

(54) MULTI-PURPOSE NETWORK DIAGNOSTIC MODULES

(75) Inventor: Jean-François Dubé, Santa Clara, CA (US)

(73) Assignee: Finisar Corporation, Sunnyvale, CA (US)

( * ) Notice: Subject to any disclaimer, the term of this patent is extended or adjusted under 35 U.S.C. 154(b) by 278 days.

(21) Appl. No.: 10/769,202

(22) Filed: Jan. 30, 2004

(65) Prior Publication Data
US 2005/0050190 A1    Mar. 3, 2005

Related U.S. Application Data

(60) Provisional application No. 60/498,070, filed on Aug. 26, 2003.

(51) Int. Cl.
*G06F 11/00* (2006.01)
(52) U.S. Cl. .......................................... 714/39; 714/27
(58) Field of Classification Search .................. 714/39, 714/27
See application file for complete search history.

(56) References Cited

U.S. PATENT DOCUMENTS

| | | | |
|---|---|---|---|
| 5,649,129 A * | 7/1997 | Kowert ........................ | 710/305 |
| 5,671,355 A * | 9/1997 | Collins ....................... | 709/250 |
| 5,754,552 A | 5/1998 | Allmond et al. | |
| 6,112,318 A * | 8/2000 | Jouppi et al. ................. | 714/47 |
| 6,335,931 B1 | 1/2002 | Strong et al. | |
| 6,430,201 B1* | 8/2002 | Azizoglu et al. ........... | 370/535 |
| 6,460,148 B2* | 10/2002 | Veenstra et al. .............. | 714/39 |
| 6,507,923 B1* | 1/2003 | Wall et al. ................... | 714/712 |
| 6,539,338 B1 | 3/2003 | Pickreign et al. | |

(Continued)

FOREIGN PATENT DOCUMENTS

WO    WO 2004015921 A1 *    2/2004

OTHER PUBLICATIONS

Barr, Michael. How Programmable Logic Works. Miller Freeman, 1999 [retrieved on Feb. 16, 2006]. Retrieved from the Internet: <URL: http://www.netrino.com/Articles/ProgrammableLogic> pp. 4-6.*

(Continued)

*Primary Examiner*—Scott Baderman
*Assistant Examiner*—Paul Contino
(74) *Attorney, Agent, or Firm*—Workman Nydegger (57) ABSTRACT

The present invention provides for flexibly configurable network diagnostic modules that can implement any of a plurality of network diagnostic functions. A network diagnostic module receives an indication that a selected network diagnostic function (e.g., network analyzer, jammer, generator, bit error rate tester, etc.) is to be implemented. The network diagnostic module receives a bit file with instructions or data for implementing the selected network diagnostic function at one or more ports. The network diagnostic module identifies a programmable logic module (e.g., a Field-Programmable Gate Array ("FPGA")) that controls the one or ports. The network diagnostic module loads a portion of the bit file at the identified programmable logic module to cause the programmable logic module and the one or more ports to interoperate to implement the selected network diagnostic function. A plurality of network diagnostic modules can be included in a common computer system chassis.

35 Claims, 4 Drawing Sheets

U.S. PATENT DOCUMENTS

| | | |
|---|---|---|
| 6,628,621 B1 * | 9/2003 | Appleton et al. ............ 370/249 |
| 6,724,729 B1 | 4/2004 | Sikdar |
| 6,745,351 B1 | 6/2004 | Mastro |
| 2003/0023912 A1 * | 1/2003 | Lesea ......................... 714/726 |
| 2003/0069947 A1 * | 4/2003 | Lipinski ..................... 709/220 |
| 2003/0159011 A1 * | 8/2003 | Unno ......................... 711/162 |
| 2003/0204781 A1 | 10/2003 | Peebles et al. |
| 2004/0153172 A1 * | 8/2004 | Rousseau et al. ............. 700/26 |
| 2004/0153775 A1 | 8/2004 | Bhattacharjee et al. |
| 2004/0153823 A1 | 8/2004 | Ansari |
| 2004/0254779 A1 * | 12/2004 | Wang et al. .................. 703/27 |
| 2005/0060413 A1 * | 3/2005 | Oyadomari et al. ........ 709/227 |

OTHER PUBLICATIONS

Guccione, Steven A., and Levi, Delon. XBI: A Java-Based Interface to FPGA Hardware, SPIE Conference on Configurable Computing: Technology and Applications, Nov. 1998, p. 1.*

Wolff, Eric. small form factor. TechTarget, Jul. 8, 2001 [retrieved on Feb. 16, 2006]. Retrieved from the Internet: <URL: http://www.Whatis.com> p. 1.*

Wolff, Eric. gigabit interface converter. TechTarget, Jun. 25, 2001 [retrieved on Feb. 16, 2006]. Retrieved from the Internet: <URL: http://www.Whatis.com> p. 1.*

* cited by examiner

MULTI-PURPOSE NETWORK DIAGNOSTIC MODULES

CROSS REFERENCE TO RELATED APPLICATIONS

The present application claims priority to U.S. Provisional Patent Application Ser. No. 60/498,070 entitled "Multi-Purpose Network Diagnostic Modules" filed Aug. 26, 2003, which is hereby incorporated by reference.

BACKGROUND OF THE INVENTION

1. The Field of the Invention

The present invention relates generally to identifying the cause of performance deviations and other problems in high speed data transmission systems and components. More particularly, embodiments of the present invention relate to configurable diagnostic modules that can perform a variety of different diagnostic tests suitable for use with various different network protocols and configurations.

2. Background and Relevant Art

Computer and data communications networks continue to proliferate due to declining costs, increasing performance of computer and networking equipment, and increasing demand for communication bandwidth. Communications networks—including wide area networks ("WANs"), local area networks ("LANs"), and storage area networks ("SANS")—allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET") and InfiniBand networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind many advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across Ethernet and SONET networks at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

Consequently, as high speed data communications systems, processes and devices mature, many designs have increasingly focused on reliability and performance issues. Accordingly, a number of diagnostic devices and tests can be utilized to aid a network administrator in both identifying existing network conditions that are causing a network to deviate from expected performance and proactively identifying network conditions that may cause a network to deviate from expected performance in the future.

One device that is used to identifying network conditions is a protocol analyzer, also called a network analyzer. Generally, a protocol analyzer runs in the background of a network, capturing, examining and logging packet traffic. Protocol analyzers can, for example, be configured to watch for unusual IP addresses, time stamps and data packets, and most have a user interface for enabling the network administrator to have access to information representing the analysis performed by the protocol analyzers. Protocol analyzers are thus a fundamental and highly useful tool for testing and debugging various types of communications networks, including computing and computer storage networks.

A protocol analyzer operates by capturing selected portions of data from a data stream that is transmitted via the communications network. The captured information may then be analyzed in greater detail by the protocol analyzer to extract desired information. For example, data transmission faults or errors, or performance errors, known generally as problem conditions, may be diagnosed by examining the captured data that is related to the problem.

Another device that is used to identify network conditions is a generator. Generally, generators generate network traffic to simulate various network conditions. For example, a generator can generate network traffic that simulates a data stream between two nodes on a network. The behavior of the two nodes, as well as other nodes of the network, can be evaluated to determine how the network responds to the simulated data stream. Thus, a network administrator may be able to identify performance deviations and take appropriate measures to prevent the performance deviations from occurring in the future.

Another device that is used to identify network conditions is a bit error rate tester. Generally, bit error rate testers operate by transmitting a predetermined bit sequence onto the data transmission path, and then analyze the predetermined bit sequence when it returns to the bit error rate tester. Typically, such analyses involve comparing the received bit sequence to a copy of the bit sequence that was initially transmitted onto the data transmission path. This comparison permits errors within the sequence to be identified and counted. After the errors in the bit sequence are counted, that information is used to calculate an overall bit error rate. If the bit error rate is too high, the data transmission path and its physical layer should be inspected. Some protocol's specifications expect the bit error rate to be less than a specific value.

Another device that is used to identify network conditions is a jammer. Generally, jammers provide the ability to selectively alter channel data, including the introduction of errors into channel data paths. Thus, jammers permit monitoring of the response of the communications system to the altered data, and help determine whether the communications system is capable of responding without experiencing adverse effects in performance such as loss of data or network traffic interruption. For example, a network system designer can perform any one of a number of different diagnostic tests to make determinations such as whether a system responded appropriately to incomplete, misplaced or missing tasks or sequences, how misdirected or confusing frames are treated, and how misplaced ordered sets are treated.

Protocol analyzers, generators, bit error rate testers, and jammers (and possibly other devices that test for network conditions) can be implemented on printed circuit boards (often referred to as "cards" or "blades") that are inserted into a computer system test chassis. Depending on the desired functionality, an administrator can insert a particular type of card into a computer system test chassis. For example, when an administrator desires to test a bit error rate for a network, the administrator can insert a bit error rate tester card into computer system test chassis. Subsequently, when the administrator desires to analyze network traffic, the administrator can remove the bit error rate test card from the computer system test chassis and insert a network analyzer card into the computer system test chassis.

Some computer system test chassis even include multiple card receptacles such that the computer system test chassis can receive a number of cards. Thus, an administrator may have some flexibility to simultaneously test a network for a variety of network conditions. For example, an administrator may include a generator card and a jammer card in a multi-receptacle computer system test chassis to simultaneously utilize both generator and jammer functionality. Unfortunately, as a network expands and/or is reconfigured, the requirements for testing the network can change. Expansion and/or reconfiguration of a network can result in an administrator having to, at least from time-to-time, remove and replace cards in a computer system test chassis. If the computer system test chassis lacks a sufficient number of receptacles, the administrator may be required to change cards with increased frequency or even obtain an additional test chassis.

There is always some chance that an administrator lacks a card for performing a particular diagnostic function. Thus, an administrator may be required to obtain a separate card for each desired diagnostic function, even if one or more diagnostic functions are performed infrequently. For example, to utilize jammer functionality even once a month, an administrator would still be required to use a jammer card. An administrator may also be required to obtain separate cards for each desired protocol, even if one or more protocols are used infrequently. For example, to diagnose a problem in a Fibre Channel network, the administrator would be required to use a Fibre Channel protocol analyzer and to diagnose a problem in a Gigabit Ethernet network, would be required to use a different Gigabit Ethernet protocol analyzer.

Also, when a card manufactured for a particular diagnostic function malfunctions, an administrator is typically required to purchase a replacement card. Further, there are limited, if any, mechanisms for modifying the functionality of a card. For example, it is typically quite difficult to alter a jammer card to perform the function of a bit error rate tester card. Therefore systems, methods, and computer program products for providing the functionality of a number of diagnostic devices and for several different protocols in a single card would be advantageous.

BRIEF SUMMARY OF THE INVENTION

The foregoing problems with the prior state of the art are overcome by the principles of the present invention, which are directed towards methods, systems, and computer program products for flexibly configuring a network diagnostic module to perform a network diagnostic function. A computer system includes one or more network diagnostic modules and is network connectable to a network. Each network diagnostic module includes one or more programmable logic modules (e.g., one or more Field Programmable Gate Arrays ("FPGAs")) that include circuitry for implementing any of a plurality of network diagnostic functions (e.g., network analyzer, jammer, generator, bit error rate tester, etc). Each programmable logic module controls one or more test ports that provide interfaces for different physical configurations (e.g., Gigabit Ethernet, Fibre Channel, etc.) and that can interoperate with the programmable logic module to implement a selected network diagnostic function.

The computer system receives an indication that a network diagnostic module is to be configured to perform a selected network diagnostic function. Receiving an indication can include receiving a configuration request that was entered at an appropriate user-interface. It may be that a selected network diagnostic function is a network diagnostic function selected from among a number of network diagnostic functions, such as, for example, from among network analyzer, jammer, bit error rate tester, and generator. In some embodiments, the network diagnostic module is included in a printed circuit board that is inserted into an appropriate receptacle at the computer system (e.g., using a Peripheral Component Interconnect ("PCI") interface). Accordingly, the network diagnostic module may be configured through electrical contacts of the receptacle.

The network diagnostic module receives a bit file with instructions for implementing the selected diagnostic function at one or more test ports that interface with the network. A bit file contains data to program a programmable logic module (e.g., an FPGA) to have a specific function. A bit file can be received from a mass storage device or even from a memory location at the computer system. Contained data can include computer-executable instructions, computer-interpretable instructions, or circuit design data (for a programmable logic module) that is processed by the network diagnostic module to implement the selected network diagnostic function. The network diagnostic module identifies a programmable logic module (e.g., an FPGA) that controls the one or more test ports. The network diagnostic module loads the contained data at the identified programmable logic module to cause the programmable logic module and the one or more test ports to interoperate to implement the selected diagnostic function. Accordingly, data contained in the bit file is loaded at the FPGA to cause the FPGA to implement the functionality of a network analyzer, jammer, bit error rate tester, generator, etc. When a new implementation is desired (e.g., changing from a jammer to a bit error rate tester) data from a new bit file can be loaded.

In some embodiments, a number of network diagnostic modules are included in a common chassis computer system. Thus, test chassis with increased numbers of flexibly Z configurable ports can be utilized to test a network. A common chassis computer system can include a mass storage interface for transferring network diagnostic data to and/or from a mass storage device, a trigger port for detecting the occurrence of events, an interconnect port for connecting to other chassis, and a remote access port for receiving commands from remote computer systems. Connected chassis can exchange control signals over links between corresponding interconnect ports. Accordingly, network diagnostic modules at a number of different chassis can be controlled from any of the other chassis. Connecting a number of chassis together can further increase the number of ports utilized to test a network.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for network diagnostic modules that can be flexibly configured to perform any of a plurality of different network diagnostic functions. A computer system includes a network diagnostic module (e.g., on printed circuit board inserted into a PCI slot of the computer system). The network diagnostic module includes one or more programmable logic modules (e.g., one or more Field Programmable Gate Arrays ("FPGAs") that have circuitry for implementing any of a plurality of network diagnostic functions (e.g., network analyzer, jammer, generator, bit error rate tester, etc). The network diagnostic modules receives an indication that the network diagnostic module is to be configured to perform a selected network diagnostic function (e.g., a network analyzer, jammer, generator, bit error rate tester, etc.)

The network diagnostic module receives a bit file with instructions for implementing the selected diagnostic function at one or more test ports. The network diagnostic module identifies a programmable logic module (e.g., a FPGA) that controls the one or more test ports. The network diagnostic module loads the included instructions at the identified programmable logic module to cause the identified programmable logic module and the one or more test ports to interoperate to implement the selected network diagnostic function. Accordingly, instructions contained in the bit file are loaded at an FPGA to cause the FPGA to implement the network diagnostic function of a network analyzer, jammer, bit error rate tester, generator, etc. When a new implementation is desired (e.g., changing from a jammer to a bit error rate tester) instructions from a new bit file can be loaded. When a programmable logic module controls more than one port, a combination of functions can be loaded (i.e. generator for one port and bit error rate tester for another port).

In some embodiments, a number of network diagnostic modules are included in a common chassis computer system. Thus, test chassis with increased numbers of flexibly configurable ports can be utilized to test a network. A common chassis computer system can include a mass storage interface for transferring network diagnostic data to and/or from a mass storage device, a trigger port for detecting the occurrence of events, an interconnect port for connecting to other chassis, and a remote access port for receiving commands from remote computer systems. Connected chassis can exchange control signals over links between corresponding interconnect ports. Accordingly, network diagnostic modules at a number of different chassis can be controlled from any of the other chassis. Connecting a number of chassis together can further increase the number of ports utilized to test a network.

Figure 1:
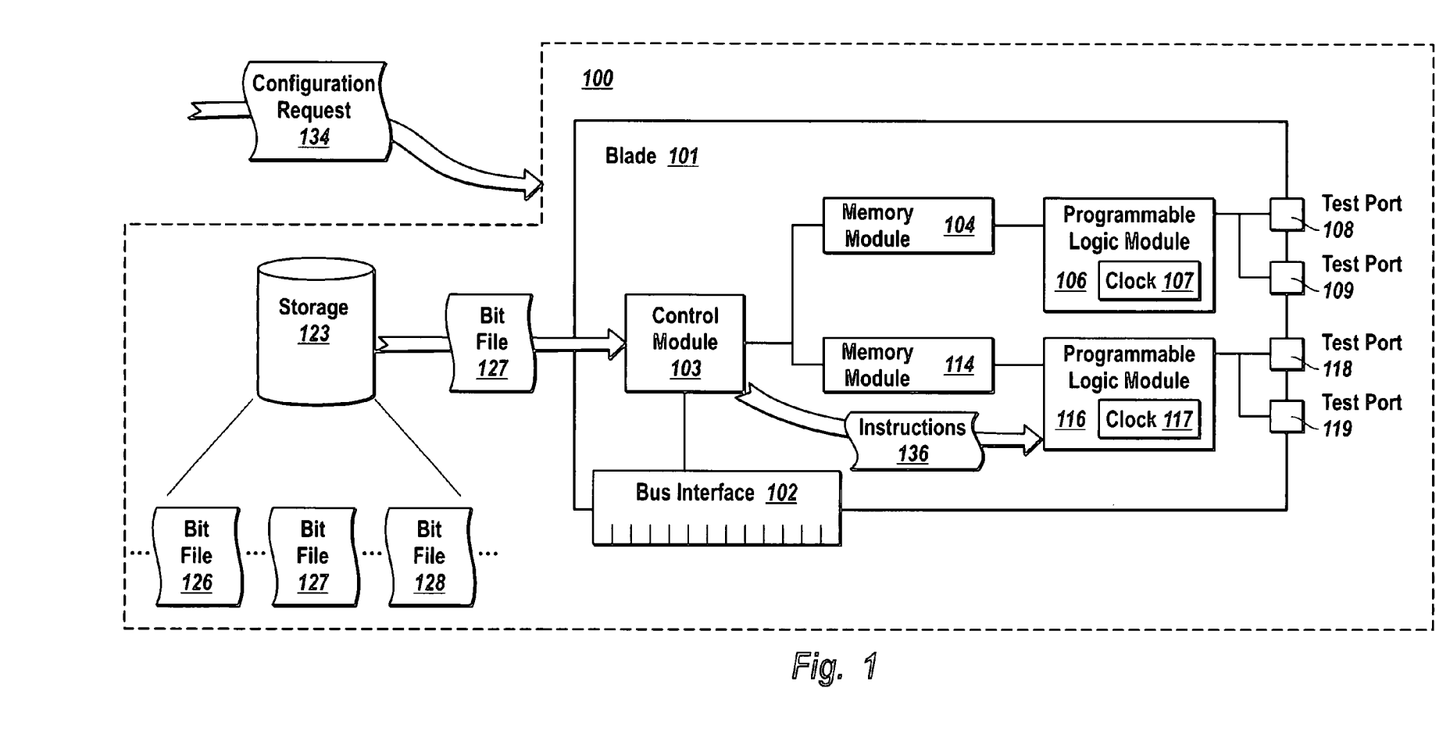
FIG. 1 illustrates an example of computer system architecture and associated modules and data structures for flexibly configuring a network diagnostic module to perform a network diagnostic function in accordance with the principles of the present invention.

FIG. 1 illustrates an example of computer system architecture 100 and associated modules and data structures for flexibly configuring a network diagnostic module to perform a network diagnostic function in accordance with the principles of the present invention. Computer system architecture 100 includes blade 101, which can be a printed circuit board. Bus interface 102 can be inserted into an appropriate receptacle (e.g., a Peripheral Component Interconnect ("PCI") interface) at a computer system to communicatively couple blade 101 to the computer system. Blade 101 can communicate (e.g., sending and receiving appropriate electrical signaling) with a corresponding computer system bus (e.g., a PCI bus) through bus interface 102.

Blade 101 includes memory 104 and programmable logic module 106 that control the functionality of test ports 108 and 109. Memory 104 can be any of a variety of different types of memory, such as, for example, Random Access Memory ("RAM"). Memory 104 can be used by programmable logic module 106 in its operation (i.e., receive or transmit network data or store other information), and to buffer data that is transferred between programmable logic module 106 and control module 103. Programmable logic module 106 can be virtually any type of programmable circuit, such as, for example, a Field-Programmable Gate Array ("FPGA"), Programmable Logic Array ("PLA"), or other type programmable logic device. Programmable logic module 106 can include circuitry for implementing any of a plurality of network diagnostic functions (e.g., network analyzer, jammer, generator, or bit error rate tester, etc).

It may be that a network diagnostic function is part of a "port personality" represented in a bit file. For example, a port personality can include a network diagnostic function and a protocol (e.g., Fiber Channel, Gigabit Ethernet, Infiniband, etc). Accordingly, programmable logic module 106 can process computer-executable or computer-interpretable instructions or implement a circuit design to cause programmable logic module 106 and test port 108 and/or test port 109 to interoperate to implement a port personality in accordance with the processed computer-executable or computer-interpretable instructions or circuit design. For example, programmable logic module 106 can process instructions from a bit file to cause programmable logic module 106 and test ports 108 and test port 109 to interoperate to implement a Fiber Channel jammer at 2.125 Gbps. Accordingly, the personality of test port 108 and the personality of test port 109 can include implementation of a particular network diagnostic function.

It may be that a plurality of test ports are utilized together to implement a particular network diagnostic function. For example, test ports 108 and 109 can be utilized together to implement a network analyzer. On the other hand, it may be a first test port is utilized to implement a first network diagnostic function, while a second different test port is simultaneously utilized to implement a second different network diagnostic function. For example, test port 108 can be utilized to implement a generator, while test port 109 is simultaneously utilized to implement a bit error rate tester. A bit file having appropriate instructions can be loaded at a programmable logic module 106 to cause test port 108 and test port 109 to simultaneously implement different network diagnostic functions. Clock 107 can coordinate the appropriate timing of data transferred to and from test port 108 and test port 109. Clock 107 can have a single clock rate for both ports 108 and 109. Alternately, clock 107 can have one clock rate for port 108 and another different clock rate for port 109.

Blade 101 also includes memory 114 and programmable logic module 116 that control the functionality of test ports 118 and 119. Similar to memory 104, memory 114 can be any of a variety of different types of memory, such as, for example, Random Access Memory ("RAM"). Memory 114 can be used by programmable logic module 116 in its operation (i.e. receive or transmit network data or store other information) and to buffer data that is transferred between programmable logic module 116 and control module 103. Similar to programmable logic module 106, programmable logic module 116 can be virtually any type of programmable circuit, such as, for example, a Field-Programmable Gate Array ("FPGA"), Programmable Logic Array ("PLA"), or other type programmable logic device. Similar to programmable logic module 106, programmable logic module 116 can include circuitry form implementing any of a plurality of network diagnostic functions (e.g., network analyzer, jammer, generator, or bit error rate tester, etc). Although not required, it may be that programmable module 106 and programmable logic module 116 are the same type of programmable logic module.

Similar to programmable logic module 106, programmable logic module 1116 can process computer-executable or computer-interpretable instructions or implement a circuit design to cause programmable logic module 116 and test port 118 and/or test port 119 to interoperate to implement a port personality (including network diagnostic function, speed, and protocol) in accordance with the processed computer-executable or computer-interpretable instructions or circuit design. Test ports 118 and 119 can be utilized together to implement a particular network diagnostic function. On the other hand, test port 118 may be utilized to implement a first network diagnostic function, while test port 119 is utilize to implement a second different network diagnostic function. For example, programmable logic module 116 can process instructions from a bit file to cause programmable logic module 116 and test ports 118 to interoperate to implement a Gigabit Ethernet bit error rate tester at 1.25 Gbps and to cause programmable logic module 116 and test ports 119 to interoperate to implement a Fibre Channel generator at 1.065 Gbps. A bit file having appropriate instructions can be loaded at a programmable logic module 116 to cause test port 118 and test port 119 to simultaneously implement different network diagnostic functions.

Clock 117 can coordinate the appropriate timing of data transferred to and from test port 118 and test port 119. Clock 117 can have a single clock rate for both ports 118 and 119. Alternately, clock 117 can have one clock rate for port 118 and another different clock rate for port 119.

Test ports of different programmable logic modules can be configured to implement the same personalities. For example, programmable logic module 106 may process instructions that that cause test ports 108 and 109 to implement a Gigabit Ethernet analyzer at 1.065 GBps, while programmable logic module 116 also processes instructions that cause test ports 118 and 119 to implement a Gigabit Ethernet analyzer at 1.065 GBps. On the other hand, test ports of different programmable logic modules can be configured to implement different personalities. For example, programmable logic module 106 may process instructions that that cause test ports 108 and 109 to implement a Fiber Channel analyzer at 2.125 GBps, while programmable logic module 116 processes instructions that cause test ports 118 and 119 to implement an Gigabit Ethernet analyzer at 1.25 GBps.

Test ports 108, 109, 118 and 119 can be of virtually any physical configuration, such as, for example, RJ-11, RJ-45, small form-factor pluggable ("SFP"), 10 Gigabit small form factor pluggable ("XFP"), Universal Serial Bus ("USB"), IEEE 1394 (Firewire), XBI, a XENPAK module (70-pin configuration), etc. Test ports 108, 109, 118 and 119 can also be physically configured to receive virtually any type of cabling, such as, for example, cabling that carries electrical signals or carries optical signals. Test ports 108, 109, 118 and 119 can be configured to receive connectors that facilitate communication using any of the variety of protocols, including Serial Attached SCSI ("SAS") and Serial ATA ("SATA") protocols. Although not required, it may be that ports controlled by the same programmable logic module are configured as the same type of port. For example, test ports 108 and 109 (both controlled by programmable logic module 106) may both be SFP ports configured to receive optical cable.

Since the programmable logic modules of blade 101 can each control a plurality of ports, blade 101 can be implemented with a reduced number of components. Accordingly, the manufacturing and financial resources consumed to produce blade 101 are also reduced (e.g., compared to a blade having one programmable logic module per port).

Computer system architecture 100 also includes storage 123. Storage 123 stores bit files that can be processed by programmable logic modules to cause ports to have particular personalities (including implementing particular network diagnostic functions). A bit file can include computer-executable instructions, computer-interpretable instructions, or a circuit design that can be processed by an appropriate programmable logic module. Each of bit files 126, 127, and 128 can be processed by programmable logic module 106 to cause port 108 and/or port 109 to have a particular personality. For example, programmable logic module 106 may process bit file 126 to cause programmable logic module 106 and test ports 108 and 109 to implement a Fiber Channel network analyzer at 2.125 Gbps. Alternately, programmable logic module 106 may process bit file 128 to cause programmable logic module and port 108 interoperate to implement a Gigabit Ethernet bit error rate tester at 1.25 Gbps and cause port 109 to implement a Gigabit Ethernet jammer at 1.25 Gbps. A series of three periods (i.e., an ellipsis) before, between, or after the depicted bit files illustrates that other bit files can also be stored at storage 123.

Control module 103 coordinates the transfer of data between bus interface 102 and memories 104 and 114. Control module 103 can translate data received from bus interface 102 (e.g., a PCI interface) into a format that can be processed by programmable logic modules included in blade 101. Likewise, control module 103 can translate data received from a programmable logic module into a format that can be compatibly transferred over a computer system bus (e.g., a PCI bus) that is communicatively coupled to bus interface 102. Based on received data (e.g., appropriate addressing information), control module 103 can also identify the programmable logic module that is associated with the received data. Accordingly, control module 103 can transfer at least a portion of the received data (e.g., computer-executable instructions, computer-interpretable instructions, or circuit design) to the associated programmable logic module.

Figure 2:
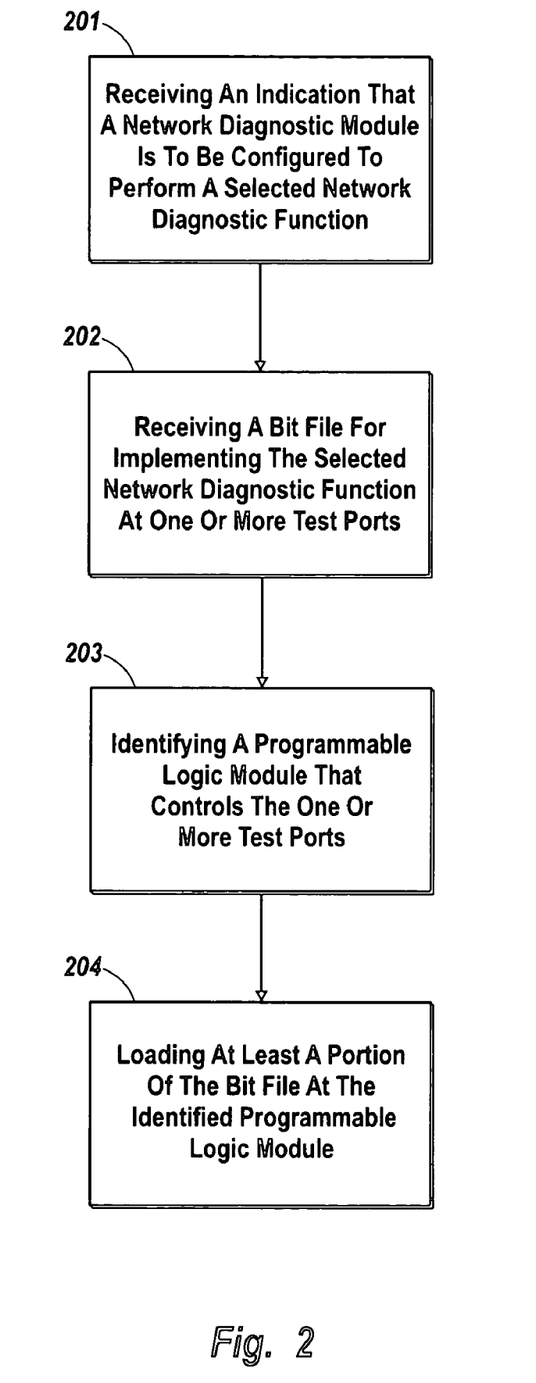
FIG. 2 illustrates a flowchart of a method for flexibly configuring a network diagnostic module to perform a network diagnostic function in accordance with the principles of the present invention.

FIG. 2 illustrates a flowchart of a method 200 for flexibly configuring a network diagnostic module to perform a network diagnostic function in accordance with the principles of the present invention. The method 200 will be discussed with respect to the modules and data depicted in computer system architecture 100.

The method 200 includes an act of receiving an indication that the network diagnostic module is to be configured to perform a selected network diagnostic function (act 201). Act 201 can include a computer system architecture receiving an indication that the network diagnostic module is to be configured to perform a selected network diagnostic function. For example, computer system architecture 100 can receive configuration request 134 indicating that port 118 and port 119 are to be configured as a network analyzer.

Configuration request 134 can be generated at a computer system that contains blade 101. It may be that configuration request 134 is manually generated. For example, an administrator or user of the computer system containing blade 101 can enter appropriate commands at an input device, such as, for example, a keyboard or mouse, to generate configuration request 134. On the other hand, it may be that configuration request 134 is automatically generated. For example, the computer system containing blade 101 can generate configuration request 134 in response to the occurrence of an event (e.g., the expiration of a timer). Alternately, configuration request 134 can be manually generated or automatically generated at a remote computer system that is network connectable to computer system architecture 100.

In response to configuration request 134, computer system architecture 100 can determine that a programmable logic module is to be configured (or re-configured) to implement the selected network diagnostic function. For example, computer system architecture 100 may determine that ports 118 and 119 are to be configured as a network analyzer. Accordingly, computer system architecture 100 can transfer a bit file with appropriate computer-executable instructions, computer-interpretable instructions or circuit design for configuring (or re-configuring) the programmable logic module to implement the selected network diagnostic function at blade 101. For example, when bit file 127 contains computer-executable instructions, computer-interpretable instructions, or circuit design data for implementing a network analyzer, computer system architecture 100 can transfer bit file 127 to blade 101.

The method 200 includes an act of receiving a bit file for implementing the selected network diagnostic function at one or more ports (act 202). Act 202 can include a control module receiving a bit file with instructions or circuit design data for implementing the selected network diagnostic function at one or more test ports that interface with a network. For example, in response to configuration request 134, control module 103 can receive bit file 127 from storage 123. Bit file 127 can include instructions or circuit design data for implementing a network analyzer at test ports 118 and 119. Test ports 118 and 119 can be network connectable to a network that is to be analyzed by the implemented network analyzer.

The method 200 includes an act of identifying a programmable logic module that controls the one or more test ports (act 203). Act 203 can include a control module within a corresponding network diagnostic module identifying a programmable logic module that controls the one or more test ports. For example, control module 103 can identify that programmable logic module 116 controls test ports 118 and 119. Control module 103 may identify programmable logic module 116 from addressing information (e.g., identifying programmable logic module 116 and/or test ports 118 and 119) included along with bit file 127.

The method 200 includes an act of loading at least a portion of the received bit file at the identified programmable logic module (act 204). Act 204 can include a network diagnostic module loading the instructions or circuit design data for implementing the selected network diagnostic function at the identified programmable logic module. For example, blade 101 can load instructions 136 at programmable logic module 116 to implement network analyzer functionality at test ports 118 and 119. Loading instructions 136 can cause programmable logic module 116 and test ports 118 and 119 to interoperate to implement the functionality of a network analyzer. Accordingly, ports 118 and 119 can be coupled to a network to analyze data on the network.

In some embodiments, instructions are loaded at a programmable logic module to re-configure corresponding ports. That is, loading instructions at a programmable logic module can cause currently configured network diagnostic functions to terminate and new network diagnostic functions to begin. For example, loading instructions 136 (to implement a network analyzer at ports 118 and 119) can cause currently implemented bit error rate tester functionality at port 118 and currently implemented generator functionality at port 119 to terminate. Accordingly, network diagnostic functionality can be altered without having to decouple bus interface 102 from a corresponding system bus.

Figure 3:
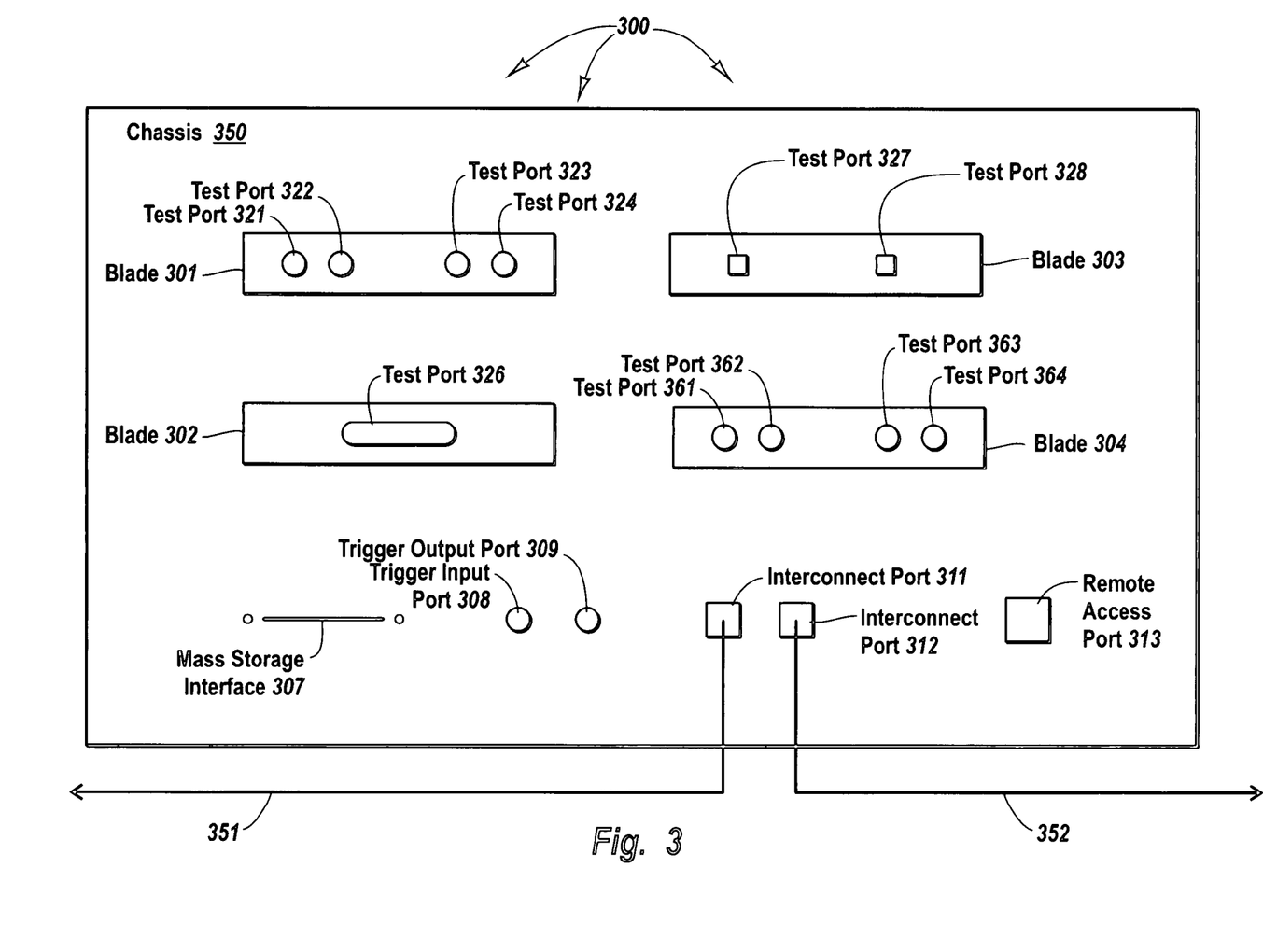
FIG. 3 illustrates an example computer system architecture including a plurality of network diagnostic modules in a common chassis in accordance with the principles of the present invention.

FIG. 3 illustrates an example computer system architecture 300 including a plurality of network diagnostic modules in accordance with the principles of the present invention. Depicted in computer system architecture 300 is chassis 350, which includes blades 301, 302, 303, and 304. Although not expressly depicted, each of blades 301, 302, 303, and 304 are coupled, through an appropriate bus interface, to a computer system bus of chassis 350. For example, each of blades 301, 302, 303, and 304 can include PCI bus interfaces that are inserted into PCI receptacles at chassis 350. Accordingly, computer-executable instructions, computer-interpretable instructions, or circuit design data can be transferred over the computer system bus to blades 301, 302, 303, and 304 to configure and re-configure corresponding test ports.

Blades coupled to a chassis can have different numbers and configurations of test ports. For example, depicted at blade 301 test ports 321, 322, 323 and 324 can each be SFP ports. Depicted at blade 303 test ports 327 and 328 can be XFP ports. Depicted at blade 302 test port 326 can be an XBI port. Depicted at blade 304 test ports 361, 362, 363, and 364 can be SFP ports. Other blades in chassis 350 (not shown) can include other test port configurations, such as, for example, for receiving a XENPAK 70-pin connector. Test ports of chassis 350 can be configured to receive connectors that facilitate communication using any of a variety of protocols, including Serial Attached SCSI ("SAS") and Serial ATA ("SATA") protocols. Accordingly, the test ports of chassis 350 can be simultaneously connected to the same or a variety of different networks, such as, for example, 10 Gigabit Ethernet, 100 Megabit Ethernet, Infiniband, and SONET networks, to implement the same or a variety of different network diagnostic functions.

Mass storage interface 307 can be an interface for coupling to mass storage devices. For example, mass storage interface 307 may be a Small Computer System Interface ("SCSI") that is coupled to a SCSI hard drive. Accordingly, as network diagnostic data is collected at blades 301, 302, 303, and 304, the network diagnostic data can be transferred to the SCSI hard drive for storage.

Interconnect ports 311 and 312 (e.g., RJ-45 ports) can be utilized to connect chassis 350 to other chassis (not shown). Connections from chassis 350 to other chassis, for example, as illustrated by links 351 and 352, can be utilized to transfer control signals that coordinate the collection of network diagnostic data. For example, the collection of network diagnostic data for a network analyzer implemented in blade 304 can be coordinated with the collection of network diagnostic data for a bit error rate tester implemented at another chassis coupled to link 351. Accordingly, through the exchange of control signals, it may be that test ports at a plurality of different chassis are configured to implement network diagnostic functions in a coordinated manner.

Trigger input port 308 and trigger output port 309 (e.g., TTL ports) can be utilized to transfer trigger signals to and from chassis 350. Generally, trigger signals can indicate the occurrence of an event to a chassis. In response to the occurrence of an event, a chassis can activate or deactivate network diagnostic functionality. For example, it may be that a programmable logic module controlling test port 326 is implementing a bit error rate tester. However, it may be desirable to activate bit error rate testing of a network coupled to port 326 only when a particular computer system is transmitting data onto the network. An appropriate mechanism for detecting when the particular computer system is transmitting data can be utilized to generate a trigger signal.

When a trigger signal (e.g., a pulse) is received at trigger input port 308, bit error rate testing through test port 326 can be activated or deactivated. In some embodiments, for example, when a plurality of chasses are connected, trigger inputs and outputs of different chassis can be coupled together so that the chassis receive the same triggers. For example, trigger input port 308 can be coupled to a trigger output port of a chassis connected to link 351 and/or trigger output port 309 can be coupled to a trigger input port of a chassis connected to link 352. Accordingly, when test ports at a plurality of different chassis are configured to perform coordinated network diagnostic functions, the network diagnostic functions can be activated and deactivated in response to the same events.

Remote access port 313 (e.g., an RJ-45 port) can be utilized to remotely configure chassis 350. Through remote access port 313, chassis 350 can be coupled to a network, such as, for example, a Local Area Network ("LAN") or Wide Area Network ("WAN"), along with one or more other computer systems. The other computer systems can utilize the network to access configuration information from chassis 350. The other computer systems can also initiate configuration requests (e.g., similar to configuration request 134) to configure or re-configure ports included in chassis 350. Accordingly, an administrator or user at a remote computer system can configure the test ports of chassis 350 (as well as configuring test ports at other chassis connected to the network) to implement selected network diagnostic functions.

Figure 4:
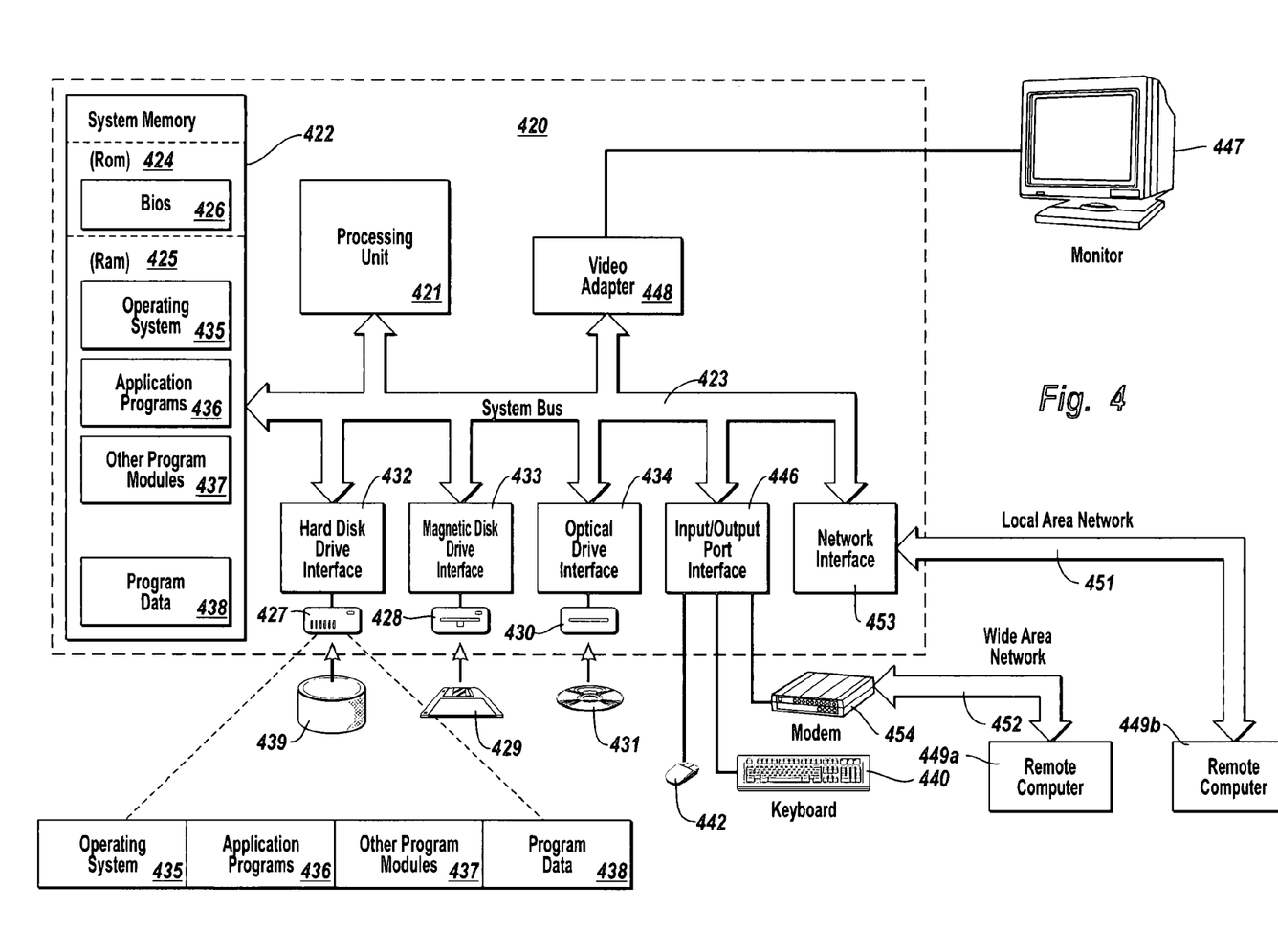
FIG. 4 illustrates a suitable operating environment for the principles of the present invention.

FIG. 4 illustrates a suitable operating environment for the principles of the present invention. FIG. 4 and the following discussion are intended to provide a brief, general description of a suitable computing environment in which the invention may be implemented. With reference to FIG. 4, an example system for implementing the invention includes a general-purpose computing device in the form of computer system 420.

Computer system 420 includes a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a PCI bus, a peripheral bus, and a local bus using any of a variety of bus architectures. Computer system 420 can include one or more receptacles for receiving print circuit boards or "cards" that interface with system bus 423. System memory 422 includes read only memory ("ROM") 424 and random access memory ("RAM") 425. A basic input/output system ("BIOS") 426, containing the basic routines that help transfer information between elements within the computer 420, such as during start-up, may be stored in ROM 424.

The computer system 420 may also include a magnetic hard disk drive 427 (e.g., a SCSI drive) for reading from and writing to a magnetic hard disk 439, a magnetic disk drive 428 for reading from or writing to a removable magnetic disk 429, and an optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide nonvolatile storage of computer-executable instructions, data structures, program modules, and other data for computer system 420. Although the example environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437 (e.g., bit files), and program data 438. A user may enter commands and information into the computer system 420 through keyboard 440, pointing device 442, or other input devices (not shown), such as, for example, a microphone, joy stick, game pad, scanner, or the like. These and other input devices can be connected to the processing unit 421 through serial port interface 446 coupled to system bus 423. Alternatively, input devices can be connected by other interfaces, such as, for example, a parallel port, a game port, a universal serial bus ("USB") port, or a Fire Wire port. A monitor 447 or other display device is also connected to system bus 423 via video adapter 448. Computer system 420 can also be connected to other peripheral output devices (not shown), such as, for example, speakers and printers.

Computer system 420 is connectable to networks, such as, for example, an office-wide or enterprise-wide computer network, an intranet, and/or the Internet. Computer system 420 can exchange data with external sources, such as, for example, remote computer systems, computer system chasses containing network diagnostic modules, remote applications, and/or remote databases over such a network.

Computer system 420 includes network interface 453, through which computer system 420 receives data from external sources and/or transmits data to external sources. As depicted in FIG. 4, network interface 453 facilitates the exchange of data with remote computer system 449b via link 451. Link 451 represents a portion of a network, and remote computer system 449b represents a node of the network.

Likewise, computer system 420 includes input/output interface 446, through which computer system 420 receives data from external sources and/or transmits data to external sources. Input/output interface 446 is coupled to modem 454, through which computer system 420 receives data from and/or transmits data to external sources. Modem can be a Data Over Cable Service Interface Specification ("DOCSIS") modem or digital subscriber lines ("DSL") modem that is connected to computer system 420 through an appropriate interface. As depicted in FIG. 4, input/output interface 446 and modem 454 facilitate the exchange of data with remote computer system 449a via link 452. Link 452 represents a portion of a network, and remote computer system 449a represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

Modules of the present invention, as well as associated data, can be stored and accessed from any of the computer-readable media associated with computer system 420. For example, portions of such modules and portions of associated program data may be included in operating system 435, application programs 436, program modules 437 and/or program data 438, for storage in system memory 422. When a mass storage device, such as, for example, magnetic hard disk 439, is coupled to computer system 420, such modules and associated program data may also be stored in the mass storage device. In a networked environment, program modules and associated data depicted relative to computer system 420, or portions thereof, can be stored in remote memory storage devices, such as, for example, system memory and/or mass storage devices associated with remote computer system 449a and/or remote computer system 449b. Execution of such modules may be performed in a distributed manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A diagnostic module comprising:
a bus interface configured to exchange data with a computer system bus;
one or more programmable logic modules, each programmable logic module configured to process first bit files that cause the programmable logic module and at least one communicatively coupled port to interoperate to implement a first one of a plurality of different network diagnostic functions, each programmable logic module including a clock configured to coordinate the transfer of data between the programmable logic module and the at least one communicatively coupled port and wherein each programmable logic module is further configured to process second bit files that cause the programmable logic module and at least one communicatively coupled port to interoperate to implement a second one of the plurality of different network diagnostic functions, wherein the second one of the plurality of network diagnostic functions is different from the first one of the plurality of different network diagnostic functions, the first and second one of the plurality of different network diagnostic functions being selected from among at least a network analyzer, a jammer, a generator, and a bit error rate tester;
one or more ports, each port communicatively coupled to one of the one or more programmable logic modules, each port being network connectable to a network; and
a control module communicatively coupled to the bus interface and communicatively coupled to each of the one or more programmable logic modules, the control module configured to coordinate the transfer of data between the bus interface and the one or more programmable logic modules.

2. The diagnostic module as recited in claim 1, wherein the bus interface comprises a PCI bus interface.

3. The diagnostic module as recited in claim 1, wherein the one or more programmable logic modules comprise one or more FPGAs.

4. The diagnostic module as recited in claim 3, wherein the one or more FPGAs comprise circuitry that, in response to receiving appropriate instructions, can implement any of the plurality of different network diagnostic functions.

5. The diagnostic module as recited in claim 1, wherein the one or more ports comprise at least one port configured to receive a small form factor pluggable connector.

6. The diagnostic module as recited in claim 1, wherein the one or more ports comprise at least one port configured to receive a 10 Gigabit small form factor pluggable.

7. The diagnostic module as recited in claim 1, wherein the control module comprises a control module configured to process address information that identifies a programmable logic module from among the one or more programmable logic modules.

8. The diagnostic module as recited in claim 1, further comprising:
one or more memory modules, each memory module communicatively coupled to a corresponding programmable logic module, each memory module configured to store data for a corresponding programmable logic module.

9. The diagnostic module as recited in claim 1, wherein the software configurable network diagnostic module comprises a printed circuit board.

10. A chassis computer system comprising:
one or more bus interface receptacles, each bus interface receptacle configured to receive a bus interface portion of a diagnostic module, each bus interface receptacle communicatively coupled to a computer system bus;
a mass storage interface communicatively coupled to the computer system bus, the mass storage interface configured to transfer collected network diagnostic data to a mass storage device;
a trigger input port communicatively coupled to the computer system bus, the trigger input port configured to receive trigger signals indicating the occurrence of an event;
a trigger output port communicatively coupled to the computer system bus, the trigger output port configured to send trigger signals indicating the occurrence of an event;
at least one interconnect port communicatively coupled to the computer system bus, the at least one interconnect port configured to exchange network diagnostic control signals with one or more other chassis computer systems;
a remote access port communicatively coupled to the computer system bus, the remote access port configured to provide a remote computer system with an interface to resources of the chassis computer system; and
one or more programmable logic modules, each programmable logic module configured to process first bit files that cause the programmable logic module and at least one communicatively coupled port to interoperate to implement a first one of a plurality of different network diagnostic functions, the first one of the plurality of different network diagnostic functions being selected from among at least a network analyzer, a jammer, a generator, and a bit error rate tester, each programmable logic module including a clock configured to coordinate the transfer of data between the programmable logic module and the at least one communicatively coupled port and wherein each programmable logic module is further configured to process second bit files that cause the programmable logic module and at least one communicatively coupled port to interoperate to implement a second one of the plurality of different network diagnostic functions, the second one of the plurality of different network diagnostic functions being selected from among at least a network analyzer, a jammer, a generator, and a bit error rate tester, wherein the second one of the plurality of network diagnostic components is different from the first one of the plurality of different network diagnostic functions.

11. The chassis computer system as recited in claim 10, wherein the one or more bus interface receptacles comprise at least one PCI bus interface receptacle.

12. The chassis computer system as recited in claim 10, wherein the mass storage interface comprises a SCSI interface.

13. The chassis computer system as recited in claim 10, wherein the trigger input port comprises a trigger input port configured to receive a TTL signal.

14. The chassis computer system as recited in claim 10, wherein the trigger output port comprises a trigger output port configured to send a TTL signal.

15. The chassis computer system as recited in claim 10, wherein the at least one interconnect port comprises at least one port configured to receive an RJ-45 connector.

16. The chassis computer system as recited in claim 10, wherein the remote access port comprises a port configured to receive a connection to a network that includes the remote computer system.

17. The chassis computer system as recited in claim 10, further comprising:
a bus interface configured to exchange data with the computer system bus;
one or more test ports, each test port communicatively coupled to one of the one or more programmable logic modules, each test port being network connectable to a test network; and
a control module communicatively coupled to the bus interface and communicatively coupled to each of the one or more programmable logic modules, the control module configured to coordinate the transfer of data between the bus interface and the one or more programmable logic modules.

18. In a computer system, a method for configuring a network diagnostic module, the method comprising the acts of:
receiving an indication that the network diagnostic module is to be configured to perform a first selected network diagnostic function;
receiving a first bit file for implementing the first selected network diagnostic function at one or more ports, the one or more ports interfacing with the network;
identifying a reconfigurable programmable logic module that controls the one or more ports;
loading at least a portion of the received first bit file at the identified reconfigurable programmable logic module to cause the one or more ports to be configured to perform the first selected network diagnostic function;
receiving an indication that the network diagnostic module is to be configured to perform a second selected network diagnostic function;

receiving a second bit file for implementing the second selected network diagnostic function at one or more ports, the one or more ports interfacing with the network; and loading at least a portion of the received second bit file at the identified reconfigurable programmable logic module to cause the one or more ports to be configured to perform the second selected network diagnostic function, wherein the second selected network diagnostic function is different from the first selected network diagnostic function, the first and second one of the selected network diagnostic functions being selected from among at least a network analyzer, a jammer, a generator, and a bit error rate tester.

19. The method as recited in claim 18, wherein the act of receiving an indication that the network diagnostic module is to be configured to perform the first or second selected network diagnostic function comprises an act of receiving user-input at an input device coupled to the computer system or a remote computer system.

20. The method as recited in claim 18, wherein the act of receiving a first or second bit file comprises an act of receiving a first or second bit file containing instructions that, when loaded at a programmable logic module, cause the programmable logic module and the one or more ports to interoperate to implement the first or second selected network diagnostic function.

21. The method as recited in claim 18, wherein the act of receiving a first or second bit file comprises an act of receiving a first or second bit file containing circuit design data that, when loaded at a programmable logic module, cause the programmable logic module and the one or more ports to interoperate to implement the first or second selected network diagnostic function.

22. The method as recited in claim 18, wherein the act of receiving a first or second bit file comprises an act of receiving a first or second bit file for implementing a port personality.

23. The method as recited in claim 18, wherein the act of identifying a programmable logic module that controls the one or more ports comprises an act of utilizing addressing information associated with the first or second bit file to identify a programmable logic module.

24. The method as recited in claim 18, wherein the act of loading at least a portion of the received second bit file at the identified programmable logic module comprises an act of reconfiguring the one or more ports from being configured to perform the first selected network diagnostics function to being configured to perform the second selected network diagnostic function.

25. The method as recited in claim 18, wherein the act of loading at least a portion the received first or second bit file at the identified programmable logic module comprises an act of loading a portion of the first or second bit file for implementing a network analyzer.

26. The method as recited in claim 18, wherein the act of loading at least a portion of the received first or second bit file at the identified programmable logic module comprises an act of a loading portion of the first or second bit file for implementing a jammer.

27. The method as recited in claim 18, wherein the act of loading the at least a portion of the received first or second bit file at the identified programmable logic module comprises an act of loading instructions or circuit design data for implementing a generator.

28. The method as recited in claim 18, wherein the act of loading the at least a portion of the first or second bit file at the identified programmable logic module comprises an act of loading a portion of the first or second bit file for implementing a bit error rate tester.

29. The method as recited in claim 18, wherein the act of loading the at least a portion of the first or second bit file at the identified programmable logic module comprises an act of loading instructions that cause the one or more ports to be configured to perform the first or second selected network diagnostic function.

30. The method as recited in claim 18, wherein the act of loading the at least a portion of the first or second bit file at the identified programmable logic module comprises an act of loading circuit data that causes the one or more ports to be configured to perform the first or second selected network diagnostic function.

31. The method as recited in claim 18, further comprising:
an act of transferring network diagnostic data through the one or more ports in accordance with the first or second selected network diagnostic function.

32. A computer program product comprising one or more computer-readable media having stored thereon computer executable instructions that, when executed by a processor, cause the computer system to perform the following:
receive an indication that a network diagnostic module is to be configured to perform first and second selected network diagnostic functions;
receive a first bit file for implementing the first selected network diagnostic function at one or more ports and receive a second bit file for implementing the second selected network diagnostic function at the one or more ports, the one or more ports interfacing with the network;
identifying a reconfigurable programmable logic module that controls the one or more ports;
loading at least a portion of the first received bit file at the identified reconfigurable programmable logic module to cause the one or more ports to be configured to perform the first selected network diagnostic function; and
loading at least a portion of the second received bit file at the identified reconfigurable programmable logic module to cause the one or more ports to be configured to perform the second selected network diagnostic function, wherein the second selected network diagnostic function is different from the first selected network diagnostic function, the first and second one of the selected network diagnostic functions being selected from among at least a network analyzer, a jammer, a generator, and a bit error rate tester.

33. The computer program product as recited in claim 32, wherein the one or more computer-readable media comprise physical storage media.

34. The computer program product as recited in claim 32, wherein the one or more computer-readable media comprise system memory.

35. A network diagnostic module configured to:
receive a first bit file, the first bit file including instructions or data for implementing a first selected network diagnostic function at one or more ports, the first selected network diagnostic function selected from among a plurality of different network diagnostic functions that can be implemented at the network diagnostic module, the one or more ports interfacing with a network;

identify a reconfigurable programmable logic module that controls the one or more ports; and
load the included instructions or data at the identified reconfigurable programmable logic module to cause the reconfigurable programmable logic module and the one or more ports to interoperate to implement the first selected network diagnostic function, wherein the reconfigurable programmable logic module and the one or more ports are configured to interoperate to implement a second selected network diagnostic function upon receipt and loading of instructions or data of a second bit file, wherein the second selected network diagnostic function is different from the first selected network diagnostic function, the first and second one of the selected network diagnostic functions being selected from among at least a network analyzer, a jammer, a generator, and a bit error rate tester.

* * * * *

UNITED STATES PATENT AND TRADEMARK OFFICE
CERTIFICATE OF CORRECTION

PATENT NO. : 7,281,167 B2
APPLICATION NO. : 10/769202
DATED : October 9, 2007
INVENTOR(S) : Jean-Francois Dube It is certified that error appears in the above-identified patent and that said Letters Patent is hereby corrected as shown below:

Column 4
Line 4 change "would be" to --he would be--

Column 6
Line 15 change "receives" to --receive--

Column 8
Line 7 change "1116" to --116--
Line 22 change "ports" to --port--
Line 25 change "ports" to --port--
Line 40 change "that that" to --that--
Line 48 change "that that" to --that--

Column 9
Line 48 delete "200"
Line 51 delete "200"
Line 54 delete "200"

Column 10
Line 26 delete "200"
Line 39 delete "200"
Line 50 delete "200"

Column 12
Line 11 change "chasses" to --chassis--

Column 13
Line 41 change "chasses" to --chassis--

Signed and Sealed this

Twenty-seventh Day of July, 2010

David J. Kappos
*Director of the United States Patent and Trademark Office*

Column 17
Line 53 change "portion the" to --portion of the--
Line 61 change "of a loading" to --of loading--
Line 64 change "the at least" to --at least--

Column 18
Line 2 change "the at least" to --at least--
Line 7 change "the at least" to --at least--
Line 12 change "the at least" to --at least--